(12) United States Patent
Hara

(10) Patent No.: US 12,391,847 B2
(45) Date of Patent: Aug. 19, 2025

(54) SILICONE COATING AGENT COMPOSITION AND ARTICLE

(71) Applicant: SHIN-ETSU CHEMICAL CO., LTD., Tokyo (JP)

(72) Inventor: Hiroyasu Hara, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 109 days.

(21) Appl. No.: 18/278,504

(22) PCT Filed: Feb. 14, 2022

(86) PCT No.: PCT/JP2022/005542
§ 371 (c)(1),
(2) Date: Aug. 23, 2023

(87) PCT Pub. No.: WO2022/181369
PCT Pub. Date: Sep. 1, 2022

(65) Prior Publication Data
US 2024/0150612 A1 May 9, 2024

(30) Foreign Application Priority Data
Feb. 24, 2021 (JP) ................. 2021-027487

(51) Int. Cl.
*C09D 183/06* (2006.01)
(52) U.S. Cl.
CPC ................. *C09D 183/06* (2013.01)
(58) Field of Classification Search
None
See application file for complete search history.

(56) References Cited

U.S. PATENT DOCUMENTS

| 2003/0105206 A1 | 6/2003 | Hara et al. |
| 2004/0260048 A1 | 12/2004 | Itagaki et al. |
| 2005/0059772 A1 | 3/2005 | Horikoshi et al. |
| 2016/0280959 A1* | 9/2016 | Kusunoki ............... C08L 83/04 |

FOREIGN PATENT DOCUMENTS

| JP | 60-233164 A | 11/1985 | |
| JP | 2005-8755 A | 1/2005 | |
| JP | 4110402 B2 | 7/2008 | |
| JP | 4114037 B2 | 7/2008 | |
| JP | 4530137 B2 | 8/2010 | |
| JP | 2016180050 A * | 10/2016 | .......... C08K 5/0091 |
| JP | 6418115 B2 | 11/2018 | |
| JP | 2021-147608 A | 9/2021 | |

OTHER PUBLICATIONS

International Search Report (PCT/ISA/210) issued in PCT/JP2022/005542, dated May 10, 2022.
Written Opinion of the International Searching Authority (PCT/ISA/237) issued in PCT/JP2022/005542, dated May 10, 2022.

* cited by examiner

*Primary Examiner* — Alexander M Weddle
(74) *Attorney, Agent, or Firm* — Birch, Stewart, Kolasch & Birch, LLP

(57) ABSTRACT

Provided is a condensation-reaction-curable silicone coating agent composition which contains, as a main component, a hydrolysable-group-containing organosiloxane mixture and also contains a curing catalyst, in which the hydrolysable-group-containing organosiloxane mixture contains an organotrisiloxane compound having a specified molecular structure in which there is at least one non-substituted, halogen-substituted or alkyl-substituted phenyl group in the molecule thereof and at least four hydrolysable groups are contained at molecule chain both ends thereof and an organodisiloxane compound having a specified structure in which there are at least two non-substituted, halogen-substituted or alkyl-substituted phenyl groups on one silicon atom in the molecule thereof and at least two hydrolysable groups are contained on the other silicon atom in the molecule thereof, and the organotrisiloxane compound and the organodisiloxane compound are contained in the hydrolysable-group-containing organosiloxane mixture at a specified blend ratio. The silicone coating agent composition has excellent storage stability although no organic solvent is contained, and can be cured rapidly at ambient temperature after being applied on a substrate to provide a cured coating film having excellent transparency, adhesiveness and the like, having excellent conformability to the shape of the substrate upon the bending of the substrate, and capable of preventing the corrosion of the substrate.

6 Claims, No Drawings

SILICONE COATING AGENT COMPOSITION AND ARTICLE

TECHNICAL FIELD

The present invention relates to a moisture-curable, room temperature-vulcanizable silicone coating composition which, when exposed to atmospheric moisture at room temperature (23° C.±10° C.), crosslinks and cures by way of hydrolytic condensation. The invention relates more particularly to a silicone coating composition for use in, for example, protecting or sealing electrical and electronic components, structural material components and the like. The silicone coating composition of the invention has an excellent shelf stability, cures rapidly at room temperature following application onto various substrates and can form a cured film of excellent transparency, flexibility (conformability to bending of the substrate), adherence (adhesion to the substrate) and low gas permeability, enabling it to be used as a silicone coating composition (or "silicone conformal coating composition") capable of imparting functionalities such as surface protection, water repellency, rust inhibition, water resistance, weather resistance, chemical resistance and stain resistance to a variety of substrates

BACKGROUND ART

Because silicone resins (organopolysiloxane resins) differ from common hydrocarbon-based organic resins in that they can form cured films which are endowed with excellent properties such as heat resistance, weather resistance, water resistance and flame retardance and have a surface with a high degree of hardness, curable silicone rubber compositions (silicone elastomer compositions) having alkoxy groups or silanol groups bonded to silicon atoms on the molecule and silicone resins (polyorganosilsesquioxane resins with a three-dimensional network structure) are widely used in applications and fields such as surface protecting materials for various substrates, heat-resistant coatings, weather-resistant coatings, water repellents and various types of binders. Of these, because silicone resins have a good heat resistance and electrical insulating properties, they are used as conformal coats on electronic substrates in, for example, consumer electronics and electronic components. Owing to resin composition innovations, coating compositions that do not require a diluting organic solvent have also become possible, and so coatings that resolve volatile organic compound (VOC) issues and have an excellent safety have come onto the market. However, ordinary silicone rubber or silicone resin-based coating compositions have a low electrode metal (especially silver electrode) protecting effect against corrosive gases such as hydrogen sulfide, and so a solution to this problem has been desired.

Up until now, to reduce metal corrosion due to corrosive gases such as hydrogen sulfide, it has been necessary to use acrylic resin or urethane resin-based coatings, but such organic resin coating materials are generally applied in an organic solvent-diluted state, presenting problems in terms of VOCs and safety. Moreover, due to drawbacks in terms of their heat resistance and electrical characteristics, there are limitations on the scope of use (service temperature, insulating properties) of acrylic and urethane-based coatings.

In light of the above, there has existed a desire for solvent-free silicone-based coatings which, in addition to possessing excellent heat resistance and electrical characteristics, have an excellent ability to prevent metal corrosion due corrosive gases such as hydrogen sulfide.

This invention is a type of material which, even among silicone-based coatings, forms a hard cured film after curing. So-called silicone varnish solutions obtained by dissolving a curable silicone resin with terminal silanol groups and an average molecular weight of from about 3,000 to about 2,000,000 in an organic solvent such as toluene or xylene are commonly used as such silicone coating compositions. Films having excellent properties such as surface hardness, adhesion, heat resistance, weather resistance and water resistance can be obtained using these solutions. However, an organic solvent which has a large environmental impact serves as an essential ingredient and, because dehydration/condensation/crosslinking reactions between the silanol groups are used, film formation generally requires a long period of curing under applied heat at 150° C. or above.

To address this, there is a need for a one package-type, solvent-free, room temperature-vulcanizable silicone coating composition that contains no organic solvent, can be cured at room temperature and has excellent shelf stability. The use of relatively low-molecular-weight silicone alkoxy oligomers obtained by the partial (co)hydrolytic condensation of an organoalkoxysilane is under investigations. At the same time, research is actively underway on curing catalysts which effectively promote moisture-mediated hydrolysis reactions and dealcoholization/condensation reactions on these silicone alkoxy oligomers and form siloxane bond-crosslinked films. This work is described in the cited literature (Patent Document 1 and 2: JP-A S60-233164 and JP No. 4110402).

However, in both of these disclosures, because the cured film that is obtained is rigid and lacks flexibility, it has a poor conformity to bending of the substrate. In addition, metal corrosion by hydrogen sulfide cannot be prevented.

In solvent-free silicone compositions, examples of technology targeted at preventing substrate metal corrosion by corrosive sulfuric gases include art in which a metal powder of silver, copper or the like is added to the composition, thereby reducing corrosion of the substrate metal due to sacrificial corrosion of the metal powder (Patent Documents 3 and 4: JP Nos. 4114037 and 4530137), and art which uses an organic additive to reduce corrosion of the substrate metal (Patent Document 5: JP No. 6418115). These are both outstanding technologies, but are means that render corrosive gases which infiltrate a silicone film harmless by way of a reaction at the interior of the film; for some types of corrosive gases, the effect has been inadequate.

PRIOR ART DOCUMENTS

Patent Documents

Patent Document 1: JP-A S60-233164
Patent Document 2: JP No. 4110402
Patent Document 3: JP No. 4114037
Patent Document 4: JP No. 4530137
Patent Document 5: JP No. 6418115

SUMMARY OF INVENTION

Technical Problem

The object of the present invention, which was conceived in order to resolve the above problems, is to provide a silicone coating composition which, although it contains no organic solvent, has an excellent shelf stability as a coating composition, incurring no loss of the properties inherent to curable organosilicon compounds and which, following application onto a substrate, rapidly cures at normal temperatures (here and below, 23° C.±10° C.), enabling a cured film to be obtained that has excellent properties such as transparency and adhesion, excellent conformity to bending of the substrate (flexibility) and, moreover, substrate corrosion inhibiting properties on account of its low gas permeability and is able in particular to reduce sulfurization due to the sulfuric gas hydrogen sulfide. More particularly, the object of the invention is to provide, in the protection, sealing, etc. of the target electrical/electronic components, structural material components and the like, a silicone coating composition (silicone conformal coating composition) which can be used in a broader temperature range, especially on the low-temperature side, by lowering the glass transition temperature (Tg) of the cured film while maintaining the corrosion inhibiting properties of the coating, and to provide also an article which has been sealed, coated, fixed or bonded with the silicone coating composition.

Solution to Problem

The inventor has conducted intensive investigations in order to achieve the above objects, discovering as a result that certain advantageous effects can be obtained by using a condensation reaction-curable silicone coating composition in which the base resin is a hydrolyzable group-containing organosiloxane mixture that uses together, in a specific compounding ratio, an organotrisiloxane compound of a specific molecular structure that includes on the molecule at least one unsubstituted, halogen-substituted or alkyl-substituted phenyl group and at least 4, preferably 4 to 6, hydrolyzable groups at both ends of the molecular chain and an organodisiloxane compound of a specific molecular structure that includes at least 2 unsubstituted, halogen-substituted or alkyl-substituted phenyl groups on the same silicon atom within the molecule and at least 2, preferably 2 or 3, hydrolyzable groups on the other silicon atom within the molecule, and which also includes a curing catalyst. Namely, a silicone coating composition can be obtained which has an excellent shelf stability under closed conditions (in an air-excluded environment) and which rapidly cures due to hydrolytic condensation upon exposure to atmospheric moisture in an open environment to give a cured film having excellent properties such as transparency and adhesion and also having excellent conformity to bending of the substrate (flexibility). In addition, because it has a low gas permeability, the cured film is able to reduce sulfurization by hydrogen sulfide. Moreover, the glass transition temperature (Tg) of the cured form of the composition can be lowered, enabling it to be used in a broader temperature range, particularly on the low-temperature side. This discovery ultimately led to the present invention.

Accordingly, the invention provides the following silicone coating composition, and the following article which has been sealed, coated, fixed or bonded by a cured form of the composition.

[1]

A silicone coating composition which includes:
(A) 100 parts by weight of a hydrolyzable group-containing organosiloxane mixture consisting of (A-1) from 20 to 95 parts by weight of a hydrolyzable group-containing organotrisiloxane compound of general formula (1-1) below and (A-2) from 80 to 5 parts by weight of a hydrolyzable group-containing organodisiloxane compound of general formula (1-2) below

[Chem. 1]

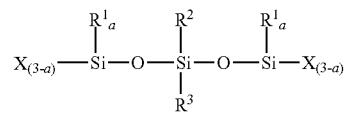

(1-1)

[Chem. 2]

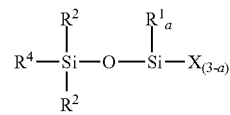

(1-2)

(wherein $R^1$, $R^3$ and $R^4$ are each independently an unsubstituted or halogen-substituted monovalent hydrocarbon group of 1 to 10 carbon atoms, $R^2$ is an unsubstituted, halogen-substituted or alkyl-substituted phenyl group, each X is independently at least one type of hydrolyzable group selected from the group consisting of unsubstituted or alkoxy-substituted alkoxy, aryloxy, alkenyloxy, acyloxy and ketoxime groups, and 'a' is independently 0 or 1 for each bonding silicon atom), with the proviso that the combined amount of component (A-1) and component (A-2) is 100 parts by weight; and
(B) from 0.01 to 10 parts by weight of a curing catalyst.

[2]

The silicone coating composition of [1] above, wherein $R^3$ in general formula (1-1) is an unsubstituted, halogen-substituted or alkyl-substituted phenyl group.

[3]

The silicone coating composition of [1] or [2] above, wherein each X in general formulas (1-1) and (1-2) is a methoxy group, ethoxy group, isopropenyloxy group or ketoxime group.

[4]

The silicone coating composition of any of [1] to [3] above, further including:
(C) a hydrolyzable organosilane compound of general formula (2) below $$(R^1)_a Si(X)_{(4-a)} \quad (2)$$

(wherein $R^1$, X and 'a' are each as defined above)
and/or a partial hydrolytic condensation product thereof other than components (A-1) and (A-2) in an amount of from 0.1 to 100 parts by weight per 100 parts by weight of component (A).

[5]

The silicone coating composition of any of [1] to [4] above, wherein the composition is free of organic solvent.

[6]

The silicone coating composition of any of [1] to [5] above, wherein component (A-1) is the product of a hydrolytic condensation reaction between a hydrolyzable organosilane compound of general formula (2) below $$(R^1)_a Si(X)_{(4-a)} \quad (2)$$

(wherein $R^1$, X and 'a' are each as defined above)

and a diorganosilanediol of general formula (3) below

[Chem. 3]

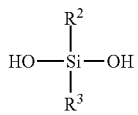

(3)

(wherein $R^2$ and $R^3$ are each as defined above),
and component (A-2) is the product of a hydrolytic condensation reaction between a hydrolyzable organosilane compound of general formula (2) and a triorganohydroxysilane of general formula (4) below

[Chem. 4]

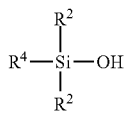

(4)

(wherein $R^2$ and $R^4$ are each as defined above).

[7]

An article that is sealed, coated, fixed or bonded with a cured form of the silicone coating composition of any of [1] to [6] above.

ADVANTAGEOUS EFFECTS OF INVENTION

This invention makes it possible to provide silicone coating compositions, especially silicone conformal coating compositions, which have an excellent shelf stability, may be applied onto substrates without including an organic solvent, and rapidly form a cured film at normal temperature following application. The cured film has excellent properties such as transparency and adhesion, excellent conformity to bending of the substrate (flexibility) and, owing to a low gas permeability, substrate corrosion inhibiting properties, enabling sulfurization due to hydrogen sulfide in particular to be reduced. In addition, the glass transition temperature (Tg) of the cured form can be lowered, allowing it to be used in a broader temperature range, especially on the low-temperature side.

DESCRIPTION OF EMBODIMENTS

The invention is described in detail below.

Component (A)

Component (A) is a hydrolyzable group-containing organosiloxane mixture consisting of, in specific proportions, (A-1) a hydrolyzable group-containing organotrisiloxane of subsequently described general formula (1-1) and a hydrolyzable group-containing organodisiloxane compound of subsequently described general formula (1-2).

The hydrolyzable group-containing organosiloxane mixture consisting of components (A-1) and (A-2) can rapidly crosslink and cure at room temperature (here and below, 23° C.±10° C.) in the presence of the subsequently described curing catalyst serving as component (B) by way of hydrolytic condensation with moisture in the atmosphere to give a cured film having excellent properties such as transparency and adhesion, excellent conformity to bending of the substrate (flexibility) and also reduced gas permeability.

Component (A-1)

Component (A-1), which serves as a base resin of the silicone coating composition of the invention, is an organotrisiloxane compound of the specific molecular structure shown in general formula (1-1) below which has on the molecule at least 1, preferably from 1 to 4, unsubstituted, halogen-substituted or alkyl-substituted phenyl group, and also has on the molecule (on the respective silicon atoms at both ends of the molecular chain) at least 4, preferably from 4 to 6, hydrolyzable groups.

[Chem. 5]

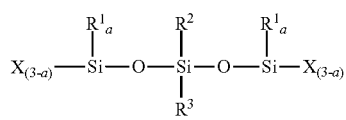

(1-1)

In the formula, $R^1$ and $R^3$ are each independently an unsubstituted or halogen-substituted monovalent hydrocarbon group of 1 to 10 carbon atoms, $R^2$ is an unsubstituted, halogen-substituted or alkyl-substituted phenyl group, each X is independently at least one type of hydrolyzable group selected from among unsubstituted or alkoxy-substituted alkoxy, aryloxy, alkenyloxy, acyloxy and ketoxime groups, and 'a' is independently 0 or 1 for each bonding silicon atom.

In above formula (1-1), $R^1$ and $R^3$ are each independently an unsubstituted or halogen-substituted monovalent hydrocarbon group of 1 to 10 carbon atoms. Examples include linear, branched or cyclic alkyl groups of 1 to 10 carbon atoms, such as methyl, ethyl, propyl, isopropyl, butyl, isobutyl, sec-butyl, tert-butyl, pentyl, neopentyl, hexyl, cyclohexyl, heptyl, octyl, 2-ethylhexyl, nonyl and decyl groups; linear, branched or cyclic alkenyl groups of 2 to 10 carbon atoms, such as vinyl, allyl, propenyl, isopropenyl, butenyl, isobutenyl, pentenyl, hexenyl and cyclohexenyl groups; aryl groups of 6 to 10 carbon atoms, such as phenyl, tolyl, xylyl, mesityl and naphthyl groups; aralkyl groups of 7 to 10 carbon atoms such as benzyl and phenylethyl groups; and halogen-substituted monovalent hydrocarbon groups in which some of the hydrogen atoms on the foregoing groups are substituted with halogen atoms, such as chloromethyl, 2-bromoethyl, 3,3,3-trifluoropropyl, 3,3,4,4,5,5,5-heptafluoropentyl, 2,3,3-trifluoro-2-chlorocyclobutyl, 3,4-dibromo-1-chlorohexyl, difluoromonochlorovinyl, 2-iodocyclohexenyl, chlorophenyl, perchlorophenyl, fluorophenyl, perfluorophenyl, 2,2,2,-trifluorotolyl and 2,4-dibromobenzyl groups.

Of these, methyl, ethyl, propyl, vinyl and phenyl groups are preferred as $R^1$. As explained also in the section on $R^2$ below, in cases where it is important for the cured film to have a low permeability to gases, an unsubstituted, halogen-substituted or alkyl-substituted phenyl group is preferred. However, various other types of monovalent organic groups may be selected for reasons having to do with design of the cure rate for the inventive composition by hydrolytic condensation.

From the standpoint of reducing the gas permeability of the resulting cured film, $R^3$ is preferably an unsubstituted, halogen-substituted or alkyl-substituted phenyl group, examples of which include phenyl, tolyl, xylyl, chlorophenyl, perchlorophenyl, fluorophenyl, perfluorophenyl and 2,2,2-trifluorotolyl groups.

Also, by having $R^3$ be a monovalent hydrocarbon group other than the above unsubstituted, halogen-substituted or alkyl-substituted phenyl groups, the Tg of the cured film can be controlled, enabling the $R^3$ to be variously designed according to the target low gas permeability and Tg. Of these, alkyl, aryl and fluoroalkyl groups are preferred on account of the good releasability and water repellency of the resulting cured film.

In above formula (1-1), $R^2$ is an unsubstituted, halogen-substituted or alkyl-substituted phenyl group, specific examples of which include phenyl, tolyl, xylyl, chlorophenyl, perchlorophenyl, fluorophenyl, perfluorophenyl and 2,2,2-trifluorotolyl groups. A phenyl group is preferred.

It is essential for the hydrolyzable group-containing organotrisiloxane compound of formula (1-1) serving as component (A-1) to have at least one unsubstituted, halogen-substituted or alkyl-substituted phenyl group on the molecule (at a non-terminal silicon atom on the molecular chain). When it is important for the cured film to have a low gas permeability, two unsubstituted, halogen-substituted or alkyl-substituted phenyl groups (i.e., both $R^2$ and $R^3$) on the formula (1-1) molecule serving as component (A-1) are desirable.

The gas permeability of the cured film is reduced by this unsubstituted, halogen-substituted or alkyl-substituted phenyl group. When the hydrolyzable group-containing organotrisiloxane compound has no unsubstituted, halogen-substituted or alkyl-substituted phenyl groups on the molecule, the gas permeability of the resulting cured film becomes high and corrosion of the substrate metal by corrosive gases cannot be reduced.

In above formula (1-1), each X is independently at least one type of hydrolyzable group selected from unsubstituted or alkoxy-substituted alkoxy, aryloxy, alkenyloxy, acyloxy and ketoxime groups. Specific examples of X include alkoxy groups of 1 to 6 carbon atoms, preferably 1 to 4 carbon atoms, such as methoxy, ethoxy, propoxy, isopropoxy, butoxy, isobutoxy, sec-butoxy and tert-butoxy groups; alkoxy-substituted alkoxy groups of 2 to 4 carbon atoms, such as methoxy-substituted methoxy, methoxy-substituted ethoxy, ethoxy-substituted methoxy and ethoxy-substituted ethoxy groups; alkenyloxy groups of 2 to 4 carbon atoms, such as vinyloxy, allyloxy, propenyloxy, isopropenyloxy and butenyloxy groups; aryloxy groups of 6 to 10 carbon atoms, such as the phenyloxy group; acyloxy groups of 2 to 4 carbon atoms, such as acetoxy and propionoxy groups; and ketoxime groups of 3 to 6 carbon atoms, such as dimethyl ketoxime, methylethyl ketoxime and diethyl ketoxime groups. Preferred examples include methoxy, ethoxy, isopropenyloxy and methyl ethyl ketoxime groups.

In above formula (1-1), 'a' is independently 0 or 1 for each bonding silicon atom, and is preferably 1.

The hydrolyzable group-containing organotrisiloxane compound serving as component (A-1) has at least 4, preferably from 4 to 6, and more preferably 4, hydrolyzable groups X per molecule (on the respective silicon atoms at both ends of the molecular chain) in formula (1-1).

Specific examples of the hydrolyzable group-containing organotrisiloxane compound of formula (1-1) include the compounds shown below.

[Chem. 6]

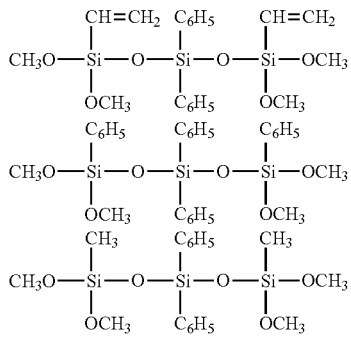

[Chem. 7]

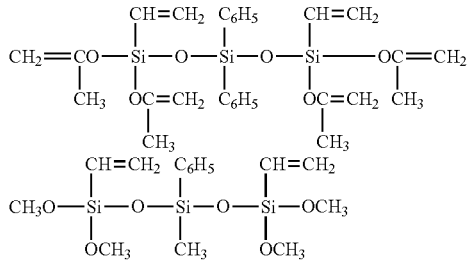

The hydrolyzable group-containing organotrisiloxane compound of general formula (1-1) above that serves as component (A-1) can be easily prepared by carrying out a de-HX/condensation reaction between a hydrolyzable organosiloxane compound of general formula (2) below having the above-described hydrolyzable group X, or $R^1$ and the hydrolyzable group X, as monovalent hydrocarbon groups bonded to the silicon atom and a diorganosilanediol of general formula (3) below having, on a molecule with one each of $R^2$ and $R^3$ above as monovalent hydrocarbon groups bonded to the silicon atom, at least one, preferably two, unsubstituted, halogen-substituted or alkyl-substituted phenyl group in the to presence of a condensation reaction catalyst and under conditions known to the art.

$$(R^1)_a Si(X)_{(4-a)} \quad (2)$$

[Chem. 8]

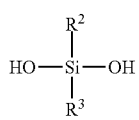

$$(3)$$

In the above formulas, $R^1$, $R^2$, $R^3$, X and 'a' are each as defined above.

Specific examples of the hydrolyzable organosilane compound of above formula (2) include vinyltrimethoxysilane, phenyltrimethoxysilane, methyltrimethoxysilane, vinyltriisopropenoxysilane, phenyltriisopropenoxysilane and methyltriisopropenoxysilane.

Specific examples of the diorganosilanediol (diorganodihydroxysilane) of above formula (3) include diphenylsilanediol and methylphenylsilanediol.

With regard to the proportions in which the hydrolyzable organosilane compound of formula (2) and the diorganosilanediol of formula (3) are reacted, the molar ratio of silanol groups from the diorganosilanediol of formula (3) to the hydrolyzable organosilane compound of formula (2) is preferably 2 or less. To reduce the amount of residual silanol groups in the reaction product, this molar ratio is more preferably at least 0.5 and not more than 1.5. In cases where the reaction product contains many remaining silanol groups from the diorganosilanediol of formula (3) that serves as a starting material, this may lower the rate of the subsequent composition curing reaction.

The condensation reaction catalyst used in the above reaction is exemplified by organometallic catalysts such as organotitanate compounds, titanium chelate compounds, aluminum chelate compounds and organozirconium compounds; and nonmetallic catalysts such as tetramethylguanidylpropyl trimethoxysilane and other guanidyl compounds.

The condensation reaction catalyst should be added in an amount that is sufficient for the condensation reaction between the hydrolyzable organosilane compound of formula (2) and the diorganosilanediol of formula (3) to proceed at room temperature or under heating. The amount is from 0.01 to 10 parts by weight, preferably from 0.1 to 5 parts by weight, per 100 parts by weight of the combined amount of the hydrolyzable organosilane compound of formula (2) and the diorganosilanediol of formula (3).

The reaction conditions are typically a temperature of from about 0° C. to about 150° C., preferably from about 25° C. to about 100° C., and a time of from about 30 seconds to about 5 hours, preferably from about 1 to about 120 minutes, and more preferably from about 10 to about 60 minutes. The reaction is preferably carried out while removing the compound HX (alcohol, acetone, etc.) that is eliminated by and forms as a by-product of the condensation reaction. Where necessary, moistening is also possible.

In the silicone coating composition of the invention, the hydrolyzable group-containing organotrisiloxane compound (A-1) of component (A) may be of one type used alone or two or more may be used in combination.

Component (A-2)

Component (A-2), which serves together with component (A-1) as the base resin of the inventive silicone coating composition, is an organodisiloxane compound of the specific molecular structure shown in general formula (1-2) below which has at least 2, preferably 2 or 3, unsubstituted, halogen-substituted or alkyl-substituted phenyl groups on the same silicon atom within the molecule and has at least 2, preferably 2 or 3, hydrolyzable groups on the other silicon atom within the molecule. By using component (A-2) together with component (A-1) and blending it in a specific ratio with component (A-1), it is possible to lower the glass transition temperature (Tg) of the target cured product. By lowering the Tg of the cured film, the flexibility of the material is retained over a broader temperature range, especially on the low-temperature side, which is a highly important property from the standpoint of expanding the temperature range at which target sealed articles can be used.

[Chem. 9]

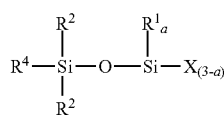

(1-2)

In the formula, $R^1$, $R^2$, X and 'a' are each as defined above, and $R^4$ is an unsubstituted or halogen-substituted monovalent hydrocarbon group of 1 to 10 carbon atoms.

In above formula (1-2), $R^1$, $R^2$, X and 'a' may be exemplified by the same groups as mentioned above for $R^1$, $R^2$, X and 'a' in formula (1-1). Here, $R^1$, $R^2$, X and 'a' may be the same as or different from $R^1$, $R^2$, X and 'a' in formula (1-1).

In formula (1-2), $R^4$ is an unsubstituted or halogen-substituted monovalent hydrocarbon group of 1 to 10 carbon atoms, and may be exemplified by the same groups as mentioned above for $R^1$ and $R^3$ in formula (1-1). An alkyl group or an alkenyl group is preferred; a methyl, ethyl, propyl, trifluoropropyl or vinyl group is more preferred.

The hydrolyzable group-containing organodisiloxane compound of formula (1-2) serving as component (A-2) has at least 2, preferably 2 or 3, and more preferably 2, unsubstituted, halogen-substituted or alkyl-substituted phenyl groups on the same silicon atom within the molecule (on the silicon atom having no hydrolyzable groups). The gas permeability of the cured film is reduced by these unsubstituted, halogen-substituted or alkyl-substituted phenyl groups. With a hydrolyzable group-containing organodisiloxane compound having no unsubstituted, halogen-substituted or alkyl-substituted phenyl groups on the molecule, the gas permeability of the resulting cured film becomes high and corrosion of the substrate metal by corrosive gases cannot be reduced.

By using the hydrolyzable group-containing organodisiloxane compound of formula (1-2) serving as component (A-2) together with component (A-1), a cured film can be formed which, while retaining a low gas permeability, has a glass transition temperature (Tg) which is lower than that of a film obtained by curing a composition of component (A-1) alone and has flexibility over a broader temperature range on the low-temperature side.

The hydrolyzable group-containing organodisiloxane compound serving as component (A-2) has, in above formula (1-2), at least 2, preferably 2 or 3, and more preferably 2, hydrolyzable groups X on the same silicon atom of the molecule (at one end of the molecular chain). A group that is suitable for achieving the desired cure rate and storage properties may be selected as the hydrolyzable group X.

Specific examples of hydrolyzable group-containing organodisiloxane compounds of formula (1-2) include the compounds shown below.

[Chem. 10]

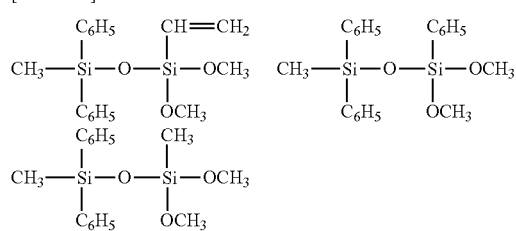

[Chem. 11]

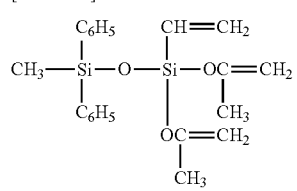

-continued

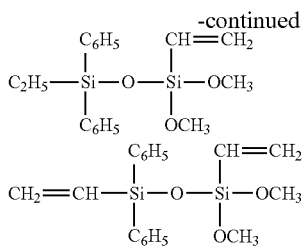

The hydrolyzable group-containing organodisiloxane compound of general formula (1-2) above that serves as component (A-2) can be easily prepared by carrying out a de-HX/condensation reaction between a hydrolyzable organosilane compound of general formula (2) below having the above hydrolyzable group X, or $R^1$ and the hydrolyzable group X, as monovalent hydrocarbon groups bonded to the silicon atom and a triorganohydroxysilane of general formula (4) below which has at least two unsubstituted, halogen-substituted or alkyl-substituted phenyl groups on a molecule having two $R^2$ groups and one $R^4$ group as monovalent hydrocarbon groups bonded to the silicon atom in the presence of a condensation reaction catalyst and under conditions known to the art.

[Chem. 12]

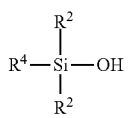

In the formulas, $R^1$, $R^2$, $R^4$, X and 'a' are each as defined above.

The hydrolyzable organosilane compound of formula (2) is exemplified by the same compounds as used in preparing the hydrolyzable group-containing organotrisiloxane compound of formula (1-1).

A specific example of the triorganohydroxysilane (triorganosilanol) of formula (4) is methyldiphenylsilanol.

With regard to the proportions in which the hydrolyzable organosilane compound of formula (2) and the triorganohydroxysilane of formula (4) are reacted, the molar ratio of the triorganohydroxyilsane of formula (4) to the hydrolyzable organosilane compound of formula (2) is preferably 2 or less. To reduce the amount of the triorganohydroxysilane of formula (4) remaining in the reaction product, this molar ratio is more preferably at least 0.5 and not more than 1.5. In cases where the remaining amount of the triorganohydroxysilane of formula (4) serving as a starting material (i.e., remaining silanol groups) is large, this may lower the rate of the subsequent composition curing reaction.

The condensation reaction catalyst used in the above reaction is exemplified by organometallic catalysts such as organotitanate compounds, titanium chelate compounds, aluminum chelate compounds and organozirconium compounds; and nonmetallic catalysts such as tetramethylguanidylpropyl trimethoxysilane and other guanidyl compounds.

The amount of condensation reaction catalyst added should be an amount sufficient for the condensation reaction between the hydrolyzable organosilane compound of formula (2) and the triorganohydroxysilane of formula (4) to proceed at room temperature or under heating. The amount is from 0.01 to 10 parts by weight, preferably from 0.1 to 5 parts by weight, per 100 parts by weight of the combined amount of the hydrolyzable organosilane compound of formula (2) and the triorganohydroxysilane of formula (4).

The reaction conditions are typically a temperature of from about 0° C. to about 150° C., preferably from about 25° C. to about 100° C., and a time of from about 30 seconds to about 5 hours, preferably from about 1 to about 120 minutes, and more preferably from about 10 to about 60 minutes. The reaction is preferably carried out while removing the compound HX (alcohol, acetone, etc.) that is eliminated by and forms as a by-product of the condensation reaction. Where necessary, moistening is also possible.

In the silicone coating composition of the invention, the hydrolyzable group-containing organodisiloxane compound (A-2) of component (A) may be of one type used alone or two or more may be used in combination.

In the hydrolyzable group-containing organosiloxane mixture serving as component (A), the proportions in which components (A-1) and (A-2) are used, expressed as the weight ratio (A-1):(A-2), is from 20:80 to 95:5, preferably from 40:60 to 95:5, and more preferably from 30:70 to 80:20. When the proportion of component (A-1) is higher than the above range (i.e., when the proportion of component (A-2) is lower than the above range), the cured film may become too hard and cause cracks to arise in the coating film. When the proportion of component (A-1) is lower than the above range (when the proportion of component (A-2) is higher than the above range), curing of the film may be inadequate.

In the silicone coating composition of the invention, there is no particular limitation on the sequence in which components (A-1) and (A-2) making up the hydrolyzable group-containing organosiloxane mixture serving as component (A) are included. The inventive composition may be prepared by first mixing together components (A-1) and (A-2) to form the mixture serving as component (A), and then mixing the component (A) mixture with component (B). Alternatively the inventive composition may be prepared by mixing either component (A-1) or component (A-2) with component (B), and then mixing whichever remains of component (A-1) and component (A-2) with this mixture.

Component (B)

The curing catalyst serving as component (B) is a condensation reaction catalyst necessary for rapidly achieving a cured film by hydrolytic condensation between component (A), which is a hydrolyzable group-containing organosiloxane mixture that includes in specific proportions (A-1) the hydrolyzable group-containing organotrisiloxane compound of general formula (1-1) and (A-2) the hydrolyzable group-containing organodisiloxane compound of general formula (1-2), and atmospheric moisture. A suitable catalyst is selected according to the reactivity of the hydrolyzable groups X that have been selected in general formula (1-1) for component (A-1) and in general formula (1-2) for component (A-2).

Such condensation reaction catalysts are exemplified by alkali metal or alkaline earth metal hydroxides, chlorides and oxides, and by basic metal salts. Specific examples include hydroxides of alkaline earth metals, such as calcium hydroxide and magnesium hydroxide; chlorides of alkaline earth metals, such as calcium chloride and magnesium chloride; oxides of alkaline earth metals, such as calcium oxide and magnesium oxide; and basic metal salts, such as basic zinc carbonate and basic magnesium carbonate.

Other condensation reaction catalysts that may be used include aluminum chelate compounds, organotitanium compounds, organozirconium compounds, organotin compounds, aminoalkyl alkoxysilanes and ammonium salts.

Examples of aluminum chelate compounds include aluminum (ethylacetoacetate) diisopropylate, aluminum di(ethylacetoacetate) isopropylate, aluminum tris(ethylacetoacetate), aluminum (acetylacetonate) diisopropylate, aluminum di(acetylacetonate) isopropylate, aluminum tris (acetylacetonate), aluminum bis(ethylacetoacetate) mono (acetylacetonate) and aluminum bis(acetylacetonate) mono (ethylacetoacetate).

Examples of organotitanium compounds include tetraisopropoxytitanium, tetra-n-butoxytitanium and tetrakis(2-ethylhexoxy)titanium.

Examples of organozirconium compounds include tetraisopropoxyzirconium, tetra-n-butoxyzirconium and tetrakis(2-ethylhexoxy)zirconium.

Examples of organotin compounds include tin salts of carboxylic acids, such as dioctyltin, dibutyltin diacetate, dibutyltin dilaurate, dibutyltin dioctoate, stannous octoate, stannous naphthenate, stannous oleate, stannous isobutyrate, stannous linoleate, stannous stearate, stannous benzoate, stannous naphthoate, stannous laurate, stannous o-thymate, stannous β-benzoyl propionate, stannous crotonate, stannous tropate, stannous p-bromobenzoate, stannous palmitoleate, stannous cinnamate and stannous phenylacetate.

Examples of aminoalkyl alkoxysilanes include tetramethylguanidylpropyl trimethoxysilane, γ-aminopropyltrimethyl methoxysilane, γ-aminopropyl triethoxysilane, N-(β-aminoethyl)-γ-aminopropyl trimethoxysilane, γ-aminopropylmethyl dimethoxysilane, N-(β-aminoethyl)-γ-aminopropylmethyl dimethoxysilane and γ-(dimethylamino)propyl trimethoxysilane.

The ammonium salts are exemplified by salts of acids and amines, examples of the acids being acetic acid and formic acid, and examples of the amines being allylamine, 2-ethylhexylamine, 3-ethoxypropylamine, diisobutylamine, 3-diethylaminopropylamine, di-2-ethylhexylamine, dibutylaminopropylamine, tri-n-octylamine, tert-butylamine, sec-butylamine, propylamine and 3-methoxypropylamine.

In order for the reaction to proceed well and for the resulting silicone coating composition to have a good curability, the curing catalyst serving as component (B) is included in an amount of from 0.01 to 10 parts by weight, preferably from 0.02 to 5 parts by weight, per 100 parts by weight of the hydrolyzable group-containing organosiloxane mixture serving as component (A) (i.e., the sum of components (A-1) and (A-2)).

Component (C)

In addition to above components (A-1), (A-2) and (B), where necessary, the silicone coating composition of the invention may also include as an optional ingredient: (C) a hydrolyzable organosilane compound of above formula (2) similar to that used as a starting material when preparing components (A-1) and (A-2), and/or a partial hydrolytic condensation product thereof. By including this component (C), the shelf stability of the composition can be improved and the curing time can be controlled.

When reacting the hydrolyzable organosilane compound of formula (2) with the diorganosilanediol of formula (3) or the triorganohydroxysilane of formula (4) to obtain component (A-1) or component (A-2), the hydrolyzable organosilane compound of formula (2) is reacted in an excess amount; the excess hydrolyzable organosilane compound of formula (2) and/or partial hydrolytic condensation product thereof following the reaction may be used directly as is.

The component (C) content should be 100 parts by weight or less (from 0 to 100 parts by weight) per 100 parts by weight of component (A). When included, the amount of this ingredient is preferably from 0.1 to 100 parts by weight, and more preferably from about 0.1 to about 50 parts by weight. Too much component (C) may lead to thermal degradation of the cured film or become a cause of discoloration.

Other Ingredients

When necessary, the silicone coating composition of the invention may further include small amounts of various additives. For example, plasticizers, parting agents, flame retardants, antioxidants, ultraviolet absorbers, and pigments or dyes such as titanium dioxide, carbon black and iron oxides may be included within ranges that do not detract from the object of the invention. In addition, fillers such as fumed silica, silica aerogel, silica gel, and reinforcing silica fillers obtained by treating these with organic silanes, organic siloxanes or organic silazanes, and also asbestos, ground fused quartz, aluminum oxide, aluminum silicate, zirconium silicate, zinc oxide, talc, diatomaceous earth, mica, calcium carbonate, clay, zirconia, glass, sand, graphite, barium sulfate, zinc sulfate, aluminum powder, sawdust, cork, fluorocarbon polymer powder, silicone rubber powder and silicone resin powder may be included within ranges that do not detract from the objects of the invention.

Moreover, where necessary, an organic solvent may be included. However, owing to concerns over VOCs and safety, it is preferable to include little or no organic solvent, provided that the composition is of a viscosity which enables it to be used in an operation.

In preparing the silicone coating composition of the invention, given amounts of the above components (A-1), (A-2) and (B) may be simply mixed together. In this case, no limitation is imposed on the temperature at the time of mixture, although it is not necessary in particular to carry out operations such as heating; the composition can be easily obtained simply by carrying out at least 10 minutes, preferably from 10 to 60 minutes, of stirring and mixture at room temperature. To prevent hydrolyzable groups such as alkoxy groups from hydrolyzing due to moisture incorporation during mixing, such mixture is preferably carried out under a nitrogen atmosphere.

A mixture containing components (A-1) and (A-2) may be prepared by mixing together components (A-1) and (A-2) after each has been separately prepared, or by simultaneously condensation reacting a mixture of the diorganosilanediol of formula (3) and the triorganohydroxysilane of formula (4) with the hydrolyzable organosilane compound of formula (2).

In this way, the silicone coating composition of the invention can provide an article that is sealed, coated, fixed or bonded with the composition in a cured form.

The silicone coating composition of the invention can be applied to and cured on, for example, various types of metal substrates, wood, stone, cement board, slate board, roof tiles, concrete, glass, ceramics, plastic products and organic resin-coated products by known methods to form a coating film. Specific examples of the method of application include brush coating, spray coating, dipping, flow coating, knife coating and spin coating, in addition to which on-site painting is also possible. The coating amount varies according to the type of substrate and the intended purpose for coating, although the film thickness after curing should generally be in the range of from 0.1 to 300 μm, and is preferably from 1 to 200 μm.

Curing conditions for the silicone coating composition of the invention are not particularly limited. However, because the composition is one that forms a film by curing with moisture in the air, the composition can be dried to a tack-free state by being left to stand in a temperature range of from room temperature to 80° C. for a period of from about 1 minute to about 2 hours, and the curing reactions can be brought to completion by additional standing for a period of from several hours to several days.

It is possible in this way to provide an article that is sealed, coated, fixed or bonded by a cured form of the silicone coating composition of the invention.

EXAMPLES

The invention is illustrated more fully below by way of Preparation Examples, Examples according to the invention and Comparative Examples, although the invention is not limited by these Examples. In the Examples, "room temperature" means 23° C., and "%" in the tables means percent by weight.

Preparation Examples

Component (A-1)

(A-1-1)
Diphenylsilanediol (16.2 g), vinyltrimethoxysilane (25 g) and a titanium chelate catalyst (0.2 g; Orgatix TC-401, from Matsumoto Fine Chemical Co., Ltd.) were added to a 100 mL flask and reacted at 100° C. for 60 minutes while at the same time removing with a stream of nitrogen gas the methanol that evolves. Excess vinyltrimethoxysilane was subsequently removed by a stream of nitrogen gas, giving an organotrisiloxane compound (A-1-1) of the following formula.

[Chem. 13]

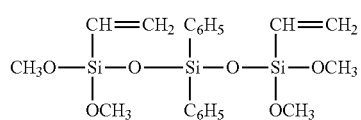

(A-1-1)

(A-1-2)
Diphenylsilanediol (16.2 g), phenyltrimethoxysilane (25 g) and a titanium chelate catalyst (0.2 g; Orgatix TC-401) were added to a 100 mL flask and reacted at 100° C. for 60 minutes while at the same time removing with a stream of nitrogen gas the methanol that evolves. Excess phenyltrimethoxysilane was subsequently removed by heating in vacuo, giving an organotrisiloxane compound (A-1-2) of the following formula.

[Chem. 14]

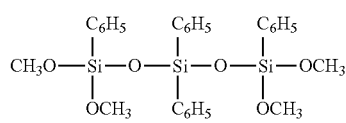

(A-1-2)

(A-1-3)
Diphenylsilanediol (16.2 g), vinyltriisopropenoxysilane (25 g) and tetramethylguanidylpropyl trimethoxysilane (0.2 g) were added to a 100 mL flask and reacted at 100° C. for 60 minutes while at the same time removing with a stream of nitrogen gas the acetone that evolves. Excess vinyltriisopropenoxysilane was subsequently removed by heating in vacuo, giving an organotrisiloxane compound (A-1-3) of the following formula.

[Chem. 15]

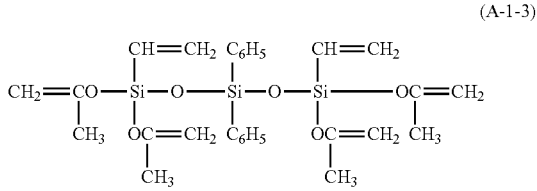

(A-1-3)

Component (A-2)

(A-2-1)
Methyldiphenylsilanol (29 g), vinyltrimethoxysilane (25 g) and a titanium chelate catalyst (0.2 g; Orgatix TC-401) were added to a 100 mL flask and reacted at 100° C. for 60 minutes while at the same time removing with a stream of nitrogen gas the methanol that evolves. Excess vinyltrimethoxysilane was subsequently removed by a stream of nitrogen gas, giving an organodisiloxane compound (A-2-1) of the following formula.

[Chem. 16]

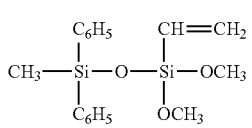

(A-2-1)

(A-2-2)
Methyldiphenylsilanol (29 g), phenyltrimethoxysilane (25 g) and a titanium chelate catalyst (0.2 g; Orgatix TC-401) were added to a 100 mL flask and reacted at 100° C. for 60 minutes while at the same time removing with a stream of nitrogen gas the methanol that evolves. Excess phenyltrimethoxysilane was subsequently removed by heating in vacuo, giving an organodisiloxane compound (A-2-2) of the following formula.

[Chem. 17]

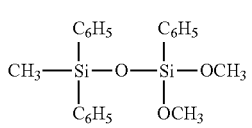

(A-2-2)

(A-2-3)
Methyldiphenylsilanol (29 g), vinyltriisopropenoxysilane (25 g) and tetramethylguanidylpropyl trimethoxysilane (0.2 g) were added to a 100 mL flask and reacted at 100° C. for 60 minutes while at the same time removing with a stream of nitrogen gas the acetone that evolves. Excess vinyltriisopropenoxysilane was subsequently removed by heating in vacuo, giving an organodisiloxane compound (A-2-3) of the following formula.

[Chem. 18]

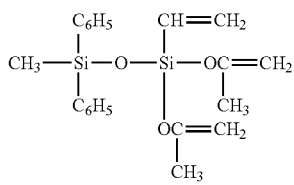

(A-2-3)

Component (A-1) (For Comparison)

(a-1)
Dimethylsilanediol (12.3 g, partially dimerized), methyltrimethoxysilane (20 g) and a titanium chelate catalyst (0.2 g; Orgatix TC-401) were added to a 100 mL flask and reacted at 100° C. for 60 minutes while at the same time removing with a stream of nitrogen gas the methanol that evolves. Excess methyltrimethoxysilane was subsequently removed by a stream of nitrogen gas, giving an organotrisiloxane compound (a-1) of the following formula.

[Chem. 19]

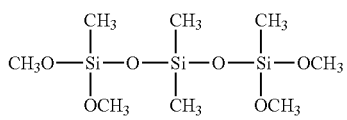

(a-1)

Component (A-2) (For Comparison)

(a-2)
Trimethylsilanol (13.5 g), methyltrimethoxysilane (20 g) and a titanium chelate catalyst (0.2 g; Orgatix TC-401) were added to a 100 mL flask and reacted at 100° C. for 60 minutes while at the same time removing with a stream of nitrogen gas the methanol that evolves. Excess methyltrimethoxysilane was subsequently removed by a stream of nitrogen gas, giving an organodisiloxane compound (a-2) of the following formula.

[Chem. 20]

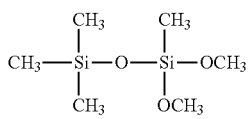

(a-2)

Examples 1 to 6, Comparative Examples 1 to 9

The ingredients shown in Tables 1 to 3 were compounded in the indicated amounts within a 10 mL glass cup and uniformly mixed by stirring for 10 minutes at room temperature to give silicone coating compositions. Examples 1 to 6 and Comparative Examples 1 to 8 were free of solvent ingredients. The appearance and physical form of the resulting silicone coating compositions were visually checked, and the results were entered in Tables 1 to 3.

The silicone coating compositions obtained as described above were cured at 23° C. and 50% RH over 7 days in the form of films having a thickness of about 2 mm. The appearance and physical form of the resulting cured products (cured films) were checked visually and by touch, and the results were entered in Tables 1 to 3. Regarding the physical form of the cured film, when no change in the surface shape of the film was observed after pressing a finger against the cured film at 23° C., the film was determined to be a "hard film"; when a depression formed on the film surface, the film was determined to be a "soft film."

The starting materials other than component (A) used in the above Preparation Examples are shown below.

Component (B)

(B-1)
Tin catalyst: U-830 (dioctyltin, from Nitto Kasei Co., Ltd.)
(B-2)
Amine catalyst: Tetramethylguanidylpropyl trimethoxysilane Component (A) (For Comparison)

(a-3)
The solvent-based coating Humiseal®-1B66NS composed primarily of an acrylic resin component was furnished for use. The solids content was 35 wt % (the solvent component accounting for 65 wt %), but this was diluted two-fold with an additional solvent (diluent: Humiseal® Thinner 901) in order to apply a thin coat.

TABLE 1

| Composition ingredients (amount included) | Example 1 | Example 2 | Example 3 | Example 4 | Example 5 | Example 6 |
| --- | --- | --- | --- | --- | --- | --- |
| Component (A-1): Trisiloxane | (A-1-1) | (A-1-1) | (A-1-2) | (A-1-2) | (A-1-3) | (A-1-3) |
| (g) | 1.5 | 1.0 | 1.5 | 1.0 | 2.0 | 2.0 |
| Component (A-2): Disiloxane | (A-2-1) | (A-2-1) | (A-2-2) | (A-2-2) | (A-2-3) | (A-2-3) |
| (g) | 0.5 | 1.0 | 0.5 | 1.0 | 0.5 | 1.0 |
| Component (B): Catalyst | (B-1) | (B-1) | (B-1) | (B-1) | (B-2) | (B-2) |
|  | U830 | U830 | U830 | U830 | amine catalyst | amine catalyst |
| (g) | 0.02 | 0.02 | 0.02 | 0.02 | 0.02 | 0.02 |

TABLE 1-continued

| Composition ingredients (amount included) | Example 1 | Example 2 | Example 3 | Example 4 | Example 5 | Example 6 |
|---|---|---|---|---|---|---|
| Evaluations | | | | | | |
| Appearance of composition | clear and light yellow | clear and light yellow | clear and light yellow | clear and light yellow | clear and light yellow | clear and light yellow |
| Physical form of composition | liquid | liquid | liquid | liquid | liquid | liquid |
| Appearance of cured product | clear and light yellow | clear and light yellow | clear and light yellow | clear and light yellow | clear and light yellow | clear and light yellow |
| Physical form of cured product | soft film | soft film | soft film | soft film | soft film | soft film |

TABLE 2

| Composition ingredients (amount included) | Comparative Example 1 | Comparative Example 2 | Comparative Example 3 | Comparative Example 4 | Comparative Example 5 | Comparative Example 6 |
|---|---|---|---|---|---|---|
| Component (A-1): Trisiloxane | (A-1-1) | (A-1-1) | (A-1-2) | (A-1-2) | (A-1-3) | (A-1-3) |
| (g) | 2.0 | 0 | 2.0 | 0 | 2.0 | 0 |
| Component (A-2): Disiloxane | (A-2-1) | (A-2-1) | (A-2-2) | (A-2-2) | (A-2-3) | (A-2-3) |
| (g) | 0 | 2.0 | 0 | 2.0 | 0 | 2.0 |
| Component (B): Catalyst | (B-1) U830 | (B-1) U830 | (B-1) U830 | (B-1) U830 | (B-2) amine catalyst | (B-2) amine catalyst |
| (g) | 0.02 | 0.02 | 0.02 | 0.02 | 0.02 | 0.02 |
| Evaluations | | | | | | |
| Appearance of composition | clear and light yellow | clear and light yellow | clear and light yellow | clear and light yellow | clear and light yellow | clear and light yellow |
| Physical form of composition | liquid | liquid | liquid | liquid | liquid | liquid |
| Appearance of cured product | clear and light yellow | uncured | clear and light yellow | uncured | clear and light yellow | uncured |
| Physical form of cured product | hard film | uncured | hard film | uncured | hard film | uncured |

TABLE 3

| Composition ingredients (amount included) | Comparative Example 7 | Comparative Example 8 | Comparative Example 9 |
|---|---|---|---|
| Component (A-1): Trisiloxane | (a-1) | (a-1) | (a-3) |
| (g) | 1.5 | 1.0 | 17% solids |
| Component (A-2): Disiloxane | (a-2) | (a-2) | 83% solvent |
| (g) | 0.5 | 1.0 | |
| Component (B): Catalyst | (B-1) U830 | (B-1) U830 | |
| (g) | 0.02 | 0.02 | |
| Evaluations | | | |
| Appearance of composition | clear and light yellow | clear and colorless | clear and colorless |
| Physical form of composition | liquid | liquid | liquid |
| Appearance of cured product | clear and light yellow | clear and light yellow | clear and colorless |
| Physical form of cured product | soft film | soft film | hard film |

Next, using the silicone coating compositions of Examples 1 to 6 and Comparative Examples 1 to 9, the appearance of the cured product, tack-free time, glass transition temperature, corrosion inhibition and flexibility were evaluated. Those results are shown in Table 4 and 5.

(Appearance of Cured Product)

The cured film on an aluminum Petri dish that was created in the evaluation of the tack-free time described below was visually evaluated for transparency and degree of coloration.

(Tack-Free Time)

About 0.20 g of the above silicone coating composition was placed on an aluminum Petri dish, spread out into an approximately 2×2 cm square shape, and the adhesion/cure time of the composition surface was evaluated by touch.

(Glass Transition Temperature (Tg))

The glass transition temperature (Tg) was measured from the endothermic properties determined using a Mettler differential scanning calorimeter (DSC).

The sample was prepared by placing about 0.03 g of the silicone coating composition on an aluminum pan and curing at 23° C. and 50% RH for 7 days. Temperature ramp-up from −60° C. to 150° C. was carried out at a ramp-up rate of 10° C./min.

(Corrosion Inhibition Test)

In order to create approximately 200-μm cured films of various materials (silicone coating compositions) on silver-plated aluminum sheets, about 0.08 g of each of the above silicone coating compositions was spread out into an approximately 2×2 cm square shape and cured at 23° C. and 50% RH for 7 days. Using a hydrogen sulfide corrosion tester, the silver-plated surface corrosion state was examined over time (initially, after 1 day, after 3 days, after 7 days, and after 14 days). The corrosion conditions are given below.

Hydrogen sulfide concentration: 2 ppm
Temperature: 23° C.
Humidity: 50% RH

The silver-plated surface before and after the corrosion test was examined. Corrosion was determined to have occurred when the surface changed (blackened or grayed) from the initial silver luster.

(Flexibility)

The coat on the coated (silicone coating composition cured film-bearing) silver-plated aluminum sheet following completion of the corrosion inhibition test was evaluated as to whether it can conform to the substrate without cracking when the sheet was bent at 23° C. through an angle of 90° with the cured film on the outside.

TABLE 4

|  | Example 1 | Example 2 | Example 3 | Example 4 | Example 5 | Example 6 |
|---|---|---|---|---|---|---|
| Organic solvent | no | no | no | no | no | no |
| Appearance of cured product | clear and light yellow | clear and light yellow | clear and light yellow | clear and light yellow | clear and light yellow | clear and light yellow |
| Tack-free time (min) | 60 | 60 | 60 | 60 | 30 | 30 |
| Tg (° C.) | 21 | 13 | 10 | 0 | 14 | 4 |
| Corrosion inhibition test | | | | | | |
| Initial | no | no | no | no | no | no |
| After 1 day | no | no | no | no | no | no |
| After 3 days | no | no | no | no | no | no |
| After 7 days | no | no | no | no | no | no |
| After 14 days | no | no | no | no | no | no |
| Flexibility | no cracking | no cracking | no cracking | no cracking | no cracking | no cracking |

TABLE 5

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|
| Organic solvent | no | no | no | no | no | no | no | no | approx. 83% |
| Appearance of cured product | clear and light yellow | uncured | clear and light yellow | uncured | clear and light yellow | uncured | clear and light yellow | clear and light yellow | clear and colorless |
| Tack-free time (min) | 60 | — | 60 | — | 30 | — | 20 | 20 | 10 |
| Tg (° C.) | 38 | — | 30 | — | 32 | — | 11 | 3 | 5 |
| Corrosion inhibition test | | | | | | | | | |
| Initial | no | — | no | — | no | — | no | no | no |
| After 1 day | no | — | no | — | no | — | no | no | no |
| After 3 days | no | — | no | — | no | — | corroded | corroded | no |
| After 7 days | no | — | no | — | no | — | corroded | corroded | no |
| After 14 days | no | — | no | — | no | — | corroded | corroded | no |
| Flexibility | cracked | — | cracked | — | cracked | — | cracked | no cracking | cracked |

(Results)

The above results confirm that the silicone coating compositions of the invention have excellent normal-temperature curability in the absence of a solvent and excellent transparency, and also that the cured films obtained by curing these compositions have an excellent transparency, have the effect of preventing corrosion of the metal substrate by corrosive gases, have an excellent substrate conformity (flexibility) and have a lower glass transition temperature, enabling the temperature range at which use is possible to be expanded.

The invention claimed is:

1. A silicone coating composition comprising:

(A) 100 parts by weight of a hydrolyzable group-containing organosiloxane mixture consisting of (A-1) from 20 to 95 parts by weight of a hydrolyzable group-containing organotrisiloxane compound of general formula (1-1) below and (A-2) from 80 to 5 parts by weight of a hydrolyzable group-containing organodisiloxane compound of general formula (1-2) below

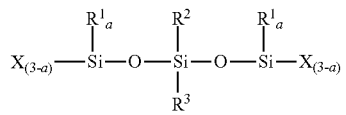
(1-1)

-continued

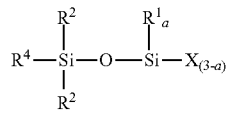
(1-2)

wherein $R^1$ and $R^4$ are each independently an unsubstituted or halogen-substituted monovalent hydrocarbon group of 1 to 10 carbon atoms, $R^2$ is an unsubstituted, halogen-substituted or alkyl-substituted phenyl group, $R^3$ is an unsubstituted, halogen-substituted, or alkyl-substituted monovalent hydrocarbon group of 1 to 10 carbon atoms, each X is independently at least one type of hydrolyzable group selected from the group consisting of unsubstituted or alkoxy-substituted alkoxy, aryloxy, alkenyloxy, acyloxy and ketoxime groups, and 'a' is independently 0 or 1 for each bonding silicon atom, with the proviso that the combined amount of component (A-1) and component (A-2) is 100 parts by weight; and (B) from 0.01 to 10 parts by weight of a curing catalyst.

2. The silicone coating composition of claim 1, wherein each X in general formulas (1-1) and (1-2) is a methoxy group, ethoxy group, isopropenyloxy group or ketoxime group.

3. The silicone coating composition of claim 1, further comprising:

(C) a hydrolyzable organosilane compound of general formula (2) below $$(R^1)_a Si(X)_{(4-a)} \qquad (2)$$

wherein $R^1$, X and 'a' are each as defined above and/or a partial hydrolytic condensation product thereof other than components (A-1) and (A-2) in an amount of from 0.1 to 100 parts by weight per 100 parts by weight of component (A).

4. The silicone coating composition of claim 1, wherein the composition is free of organic solvent.

5. The silicone coating composition of claim 1, wherein component (A-1) is the product of a hydrolytic condensation reaction between a hydrolyzable organosilane compound of general formula (2) below $$(R^1)_a Si(X)_{(4-a)} \qquad (2)$$

wherein $R^1$, X and 'a' are each as defined above and a diorganosilanediol of general formula (3) below

(3)

wherein $R^2$ and $R^3$ are each as defined above, and component (A-2) is the product of a hydrolytic condensation reaction between a hydrolyzable organosilane compound of general formula (2) and a triorganohydroxysilane of general formula (4) below

(4)

wherein $R^2$ and $R^4$ are each as defined above.

6. An article that is sealed, coated, fixed or bonded with a cured form of the silicone coating composition of claim 1.

* * * * *